United States Patent [19]
Wagner

[11] Patent Number: 5,188,415
[45] Date of Patent: Feb. 23, 1993

[54] PIVOTABLE TAILGATE CONNECTOR
[76] Inventor: Mark E. Wagner, 206 Oak Forest La., Trinity, N.C. 27370
[21] Appl. No.: 867,780
[22] Filed: Apr. 13, 1992
[51] Int. Cl.⁵ .............................................. B62D 33/02
[52] U.S. Cl. .................................................... 296/57.1
[58] Field of Search ................................ 296/57.1, 50

*Primary Examiner*—Robert R. Song

[57] ABSTRACT

The invention herein pertains to a rigid, pivotable connector which spans the gap between a vehicle bed such as a vehicle truck bed and a the swingable tailgate joined thereto. The invention allows loading and unloading heavy articles conveniently across the tailgate and prevents cart wheels or the like from slipping into the gap between the tailgate and the truck bed. The connector is hinged to the truck bed and will span the gap between the bed and the tailgate to prevent debris from falling into the tailgate hinge therebeneath.

14 Claims, 2 Drawing Sheets

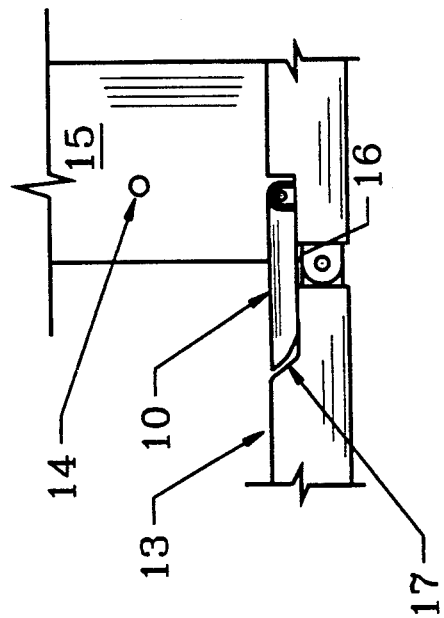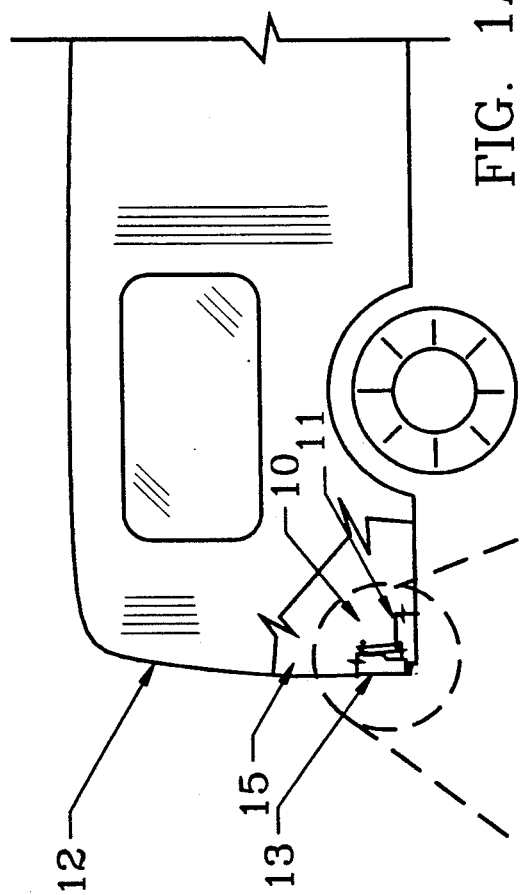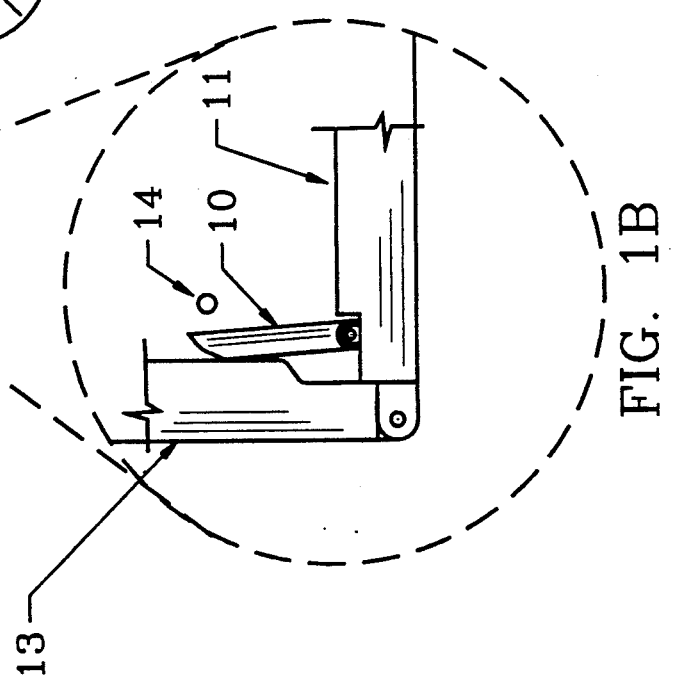

PIVOTABLE TAILGATE CONNECTOR

BACKGROUND OF THE INVENTION

1. Field Of The Invention

The invention herein pertains to vehicle bodies and particularly to vehicle bodies for vans and pickup trucks which have a swingable tailgates.

2. Description Of The Prior Art And Objectives Of The Invention

In past years pickup trucks have had the majority of vehicle tailgates which swing from a raised, upright position to a lowered, horizontal position for ease and convenience in loading and unloading equipment or supplies to and from the truck bed. In recent years more and more vehicles such as station wagons, vans, four wheel drive vehicles and others are equipped with swingable tailgates to increase their convenience and functionality. Generally, all swingable tailgates create a gap between the end of the truck bed and the tailgate as the tailgate is lowered. This can cause difficulty and may provide an obstacle when loading or unloading heavy articles. Oftentimes wheels of carts which are used during loading become lodged within the gap and extra effort must be extended to dislodge the wheels. Also, when dirt and other particulate matter is carried on truck beds, loose particles oftentimes fall into the gap created for the tailgate hinge, causing the tailgate movement to jam.

In order to prevent these problems prior devices have been conceived such as shown in U.S. Pat. No. 4,763,945 in which a resilient foldable mat is affixed between the bed and the tailgate. Also, U.S. Pat. No. 3,881,768 demonstrates a molded, single piece liner which includes a tailgate cover.

While the aforesaid devices are of benefit under certain circumstances, in other situations they do not provide the solutions or advantages sought, and it is with this in mind that the present invention was conceived. One of the objectives of this invention is thus to provide a rigid, pivotable connector affixed to the truck bed which will allow the user of the vehicle to easily load and unload heavy articles therefrom without concern of the gap between the tailgate and truck bed when the tailgate is lowered. (Rigid as used herein is to distinguish the present construction from prior art foldable or bendable connectors or the like.)

It is still another objective of the present invention to provide a hinged tailgate connector which will pivot to a vertical position as the tailgate is raised and which will pivot to a horizontal, level posture when the tailgate is lowered.

It is still another objective of the present invention to provide a hingable tailgate connector which can be retrofit to any of the large variety of existing and new vehicles available to prevent dirt and other debris from falling into the tailgate hinge area.

Various other objectives and advantages of the present invention become apparent to those skilled in the art as a more detailed presentation is set forth below.

SUMMARY OF THE INVENTION

The invention herein pertains to a pivotable tailgate connector for vehicles having swingable tailgates and comprises a substantially rigid, flat substantially rectangular member which is mounted at the distal end of the truck bed. The tailgate connector is attached to pivot from an upright position when the tailgate is closed to a level or horizontal position when the tailgate is opened. The tailgate connector prevents debris or other materials from falling into the tailgate hinge area and also, by spanning the gap between the tailgate and the truck bed when the tailgate is lowered, it allows cart wheels and other articles to move across the tailgate smoothly, without difficulty.

BRIEF DESCRIPTION OF THE DRAWINGS

FIG. 1A demonstrates a conventional vehicle having a swingable tailgate with a side of the vehicle body cut-away to show the invention positioned thereon;

FIG. 1B shows an enlarged view of the invention as shown in FIG. 1A;

FIG. 2 shows a partial enlarged side view of the invention as shown in FIG. 1B;

DESCRIPTION OF THE PREFERRED EMBODIMENT

Figure 3:
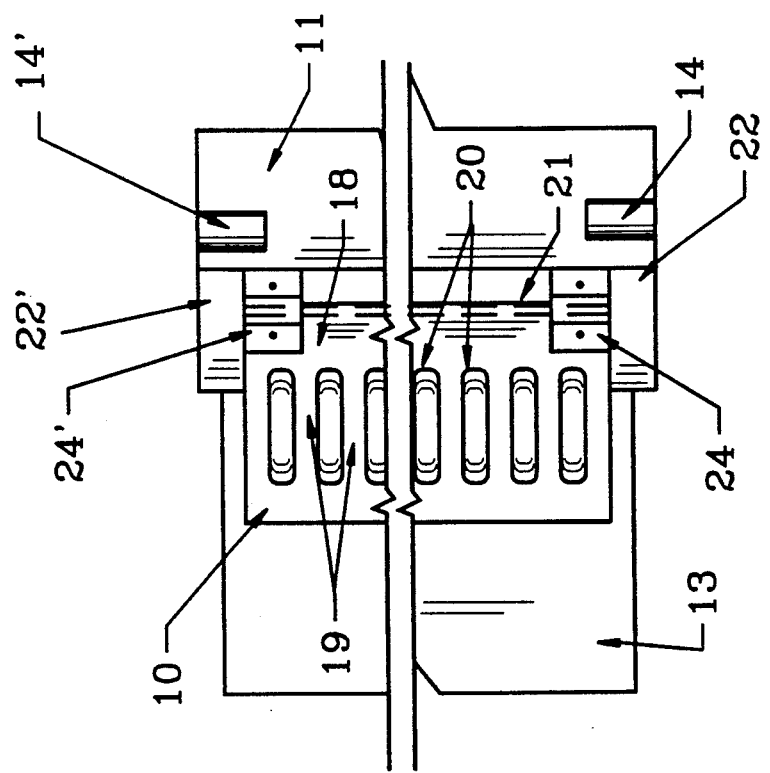
FIG. 3 illustrates a schematic top view of a pickup truck bed employing the invention with the tailgate lowered.

The preferred form of the invention is illustrated in FIGS. 1A, 1B, 2 and 3 whereby vehicles having a swingable tailgate are equipped with the pivotable tailgate connector of the invention. As shown, the connector is attached to the rear end of the vehicle bed and, in FIG. 1B, rests in a substantially vertical position against the upright or raised tailgate. In FIG. 2 the tailgate is illustrated in a lowered or opened fashion whereby the connector has pivoted downwardly to a substantially horizontal position to allow the user to move furniture or equipment easily over the gap between the tailgate and the truck bed. The connector includes a means to hinge itself to the truck bed and includes a beveled, free rear end or edge to allow it to easily slide over the tailgate surface as the tailgate is lowered and raised. The connector is formed from a substantially rigid polymeric material such as polystyrene and is formed with a series of ribs as shown in FIG. 3 to add strength and durability. The connector may be for example one-eighth of an inch thick and may extend for approximately five inches from the rear end of the truck bed to which it is attached over the gap therebeneath to the tailgate.

DETAILED DESCRIPTION OF THE DRAWINGS AND OPERATION OF THE INVENTION

For a better understanding of the invention and its operation, turning now to the drawings, pivotal tailgate connector 10 is shown in FIG. 1A mounted on bed 11 of a Chevrolet Suburban 12. As would be understood, other vehicle types may be retrofit which have a swingable tailgate 13. As further seen in FIG. 1B, connector 10 is in a substantially upright position and rests between tailgate 13 and connector stop 14 which is mounted to sidewall 15 of vehicle 12 (FIG. 1A). Stops 14, 14' (FIG. 3) may comprise resilient cylinders bolted to the vehicle sidewall three to four inches above the vehicle bed.

In FIG. 2, tailgate 13 has been lowered whereby connector 10 is in a substantially level, horizontal position to span gap 16 between truck bed 11 and tailgate 13. The free, rearward or rear lip or edge 17 of connector 10 is rounded or beveled to facilitate movement along tailgate 13 as tailgate 13 is being raised. Connector 10 may be formed from any suitable, rigid, durable material which will allow weight to be placed thereon as may occur in the movement of a heavy article such as furniture or a loaded cart rolling thereacross. Polymeric materials such as rigid polystyrene or otherwise may be used as could conventional aluminum and other metals. As shown in FIG. 3, pivotal connector 10 comprises a substantially rectangular shaped flat member 18 which is formed with a series of ribs 19 between indentions 20. This ribbed construction gives rigidity to member 18 and can be conventionally formed from various suitable materials.

Figure 4:
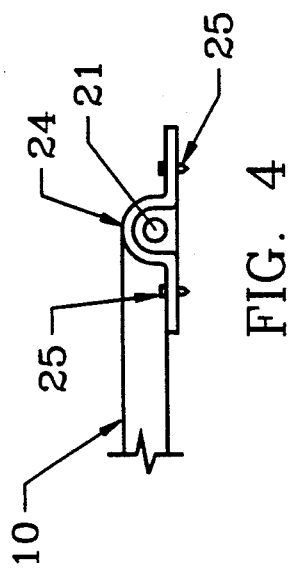
FIG. 4 depicts an enlarged view of a bracket with the tailgate connector rod held therein.

Rectangular member 18 of FIG. 3 includes a steel cylindrical connector rod 21 molded therein along the inside edge and extends beyond the cut-out sections of member 18 at corners 22, 22'. Bracket 24 as shown in enlarged fashion in FIG. 4 maintains connector rod 21 and allows it to rotate therein. Brackets 24, 24' (FIG. 3) are joined to bed 11 by screws 25 (FIG. 4) which are conventional sheet metal screws.

Figure 5:
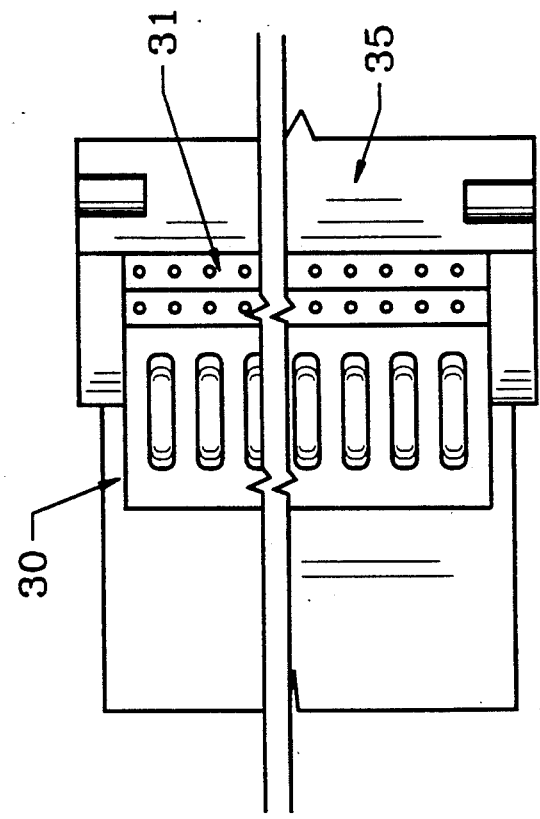
FIG. 5 shows yet another embodiment of the hinge mechanism as seen in FIG. 2.

In another embodiment of the invention as featured in FIG. 5, pivotal connector 30 is joined to the rear of bed 35 by piano hinge 31. Piano hinge 31 is conventionally connected to connector 30 by screws or the like and provides another means to hinge pivotal connector 30 to truck bed 35. Also, hinge 31 could be attached so it would be hidden, i.e., attached beneath connector 30.

The illustrations and examples provided herein are for explanatory purposes and are not intended to limit the scope of the appended claims.

I claim:

1. A pivotable tailgate connector for a vehicle having a swingable tailgate connected to the rear of the vehicle bed, said connector to span the gap between the vehicle bed and the tailgate when the tailgate is lowered, said connector comprising: a relatively flat rigid member having a front and a rear edge, means to hinge said connector, said hinge means joined to said connector front edge, said connector positioned at the rear of the vehicle bed contiguous to said tailgate whereby said connector will pivot from a horizontal to a vertical position as said tailgate is swung from a lowered to a raised posture.

2. A pivotable tailgate connector as claimed in claim 1 wherein said connector is ribbed.

3. A pivotable tailgate connector as claimed in claim 2 wherein said ribbed material is formed from a metal.

4. A pivotable tailgate connector as claimed in claim 2 wherein said ribbed material is formed from a synthetic polymer.

5. A pivotable tailgate connector as claimed in claim 1 wherein said hinge means comprises a connector rod, said rod joined to said connector, a pair of rod brackets, said brackets for rotatably receiving said connector rod, said brackets mounted to said vehicle bed.

6. A pivotable tailgate connector as claimed in claim 1 and including a connector stop, said stop affixed on said vehicle above said bed.

7. A pivotable tailgate connector as claimed in claim 1 wherein said hinge means comprises a piano hinge.

8. A pivotable tailgate connector for a vehicle having a bed, a pair of bed sidewalls and a rear swingable tailgate, said tailgate joined to the rear of said bed and swingable from a raised position in contact with said sidewalls to a substantially horizontal lowered position, said connector comprising: a relatively flat rigid member having a front and a rear edge, a means to hinge said connector to said vehicle, said hinge means joined to said vehicle bed and to the front edge of said connector, said connector contiguous to said tailgate whereby said connector will pivot against said tailgate as said tailgate is lowered and raised, a connector stop, said stop positioned on one of said bed sidewalls, said stop to terminate the pivotable motion of said connector.

9. A pivotable tailgate connector as claimed in claim 8 wherein said hinge means includes a connector rod, said rod extending through said connector beyond the ends thereof.

10. A pivotable tailgate connector as claimed in claim 8 wherein said connector comprises a beveled front lip.

11. A pivotable tailgate connector as claimed in claim 8 and including a second connector stop, said second stop positioned on the other of said bed sidewalls.

12. A pivotable tailgate connector as claimed in claim 8 wherein said connector is molded from a polymeric material.

13. A pivotable tailgate connector for a vehicle having a swingable tailgate connected to the rear of the vehicle bed, said connector to span the gap between the vehicle bed and the tailgate when the tailgate is lowered, said connector comprising: a relatively flat member having a front and a rear edge, means to hinge said connector, said hinge means joining said connector front edge to the rear of said vehicle bed, said connector positioned contiguous to said tailgate whereby said connector will pivot from a horizontal to a vertical position as said tailgate is swung from a lowered to a raised posture.

14. A pivotable tailgate connector as claimed in claim 13 wherein said connector is formed from a synthetic polymer.

* * * * *